(12) United States Patent
Han et al.

(10) Patent No.: US 12,412,886 B2
(45) Date of Patent: Sep. 9, 2025

(54) HIGH-NICKEL ELECTRODE SHEET HAVING REDUCED REACTIVITY WITH MOISTURE AND MANUFACTURING METHOD THEREFOR

(71) Applicant: LG ENERGY SOLUTION, LTD., Seoul (KR)

(72) Inventors: Song Yi Han, Daejeon (KR); Ji Hoon Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 702 days.

(21) Appl. No.: 17/631,306

(22) PCT Filed: Apr. 26, 2021

(86) PCT No.: PCT/KR2021/005217
§ 371 (c)(1),
(2) Date: Jan. 28, 2022

(87) PCT Pub. No.: WO2021/225316
PCT Pub. Date: Nov. 11, 2021

(65) Prior Publication Data
US 2022/0263062 A1      Aug. 18, 2022

(30) Foreign Application Priority Data

May 7, 2020   (KR) .................. 10-2020-0054235
Apr. 16, 2021 (KR) .................. 10-2021-0049862

(51) Int. Cl.
*H01M 4/1391*     (2010.01)
*H01M 4/04*       (2006.01)
(Continued)

(52) U.S. Cl.
CPC ......... *H01M 4/131* (2013.01); *H01M 4/0404* (2013.01); *H01M 4/0435* (2013.01);
(Continued)

(58) Field of Classification Search
CPC .. H01M 4/131; H01M 4/0404; H01M 4/0435; H01M 4/0471; H01M 4/1391;
(Continued)

(56) References Cited

U.S. PATENT DOCUMENTS

2010/0003598 A1* 1/2010 Nakamura ............. H01M 4/02
                                                      429/209
2010/0330267 A1  12/2010 Shimizu et al.
(Continued)

FOREIGN PATENT DOCUMENTS

CN    102047472 A    5/2011
CN    107949938 A    4/2018
(Continued)

OTHER PUBLICATIONS

Extended European Search Report issued in corresponding European Patent Application No. 21800583.3 dated Jan. 30, 2023.
(Continued)

*Primary Examiner* — Lisa S Park
(74) *Attorney, Agent, or Firm* — Morgan, Lewis & Bockius LLP (57) ABSTRACT

In the present invention, a slurry for a second cathode mixture is applied to both edge regions of an electrode sheet holing portion during storage of an electrode sheet having a high content of nickel, wherein the edge regions are vulnerable to moisture penetration and high in rolling reduction ratio and the slurry contains a cathode active material more resistant to rolling than that applied to the center region of the holding portion, whereby the reactivity of nickel and moisture is suppressed as much as possible to improve the lifespan characteristics of the battery.

18 Claims, 5 Drawing Sheets

(51) Int. Cl.
- H01M 4/131 (2010.01)
- H01M 4/505 (2010.01)
- H01M 4/525 (2010.01)
- H01M 10/04 (2006.01)
- H01M 10/0525 (2010.01)
- *H01M 4/02* (2006.01)

(52) U.S. Cl.
CPC ....... H01M 4/0471 (2013.01); H01M 4/1391 (2013.01); H01M 4/505 (2013.01); H01M 4/525 (2013.01); H01M 10/0525 (2013.01); *H01M 2004/021* (2013.01); *H01M 2004/028* (2013.01)

(58) Field of Classification Search
CPC .. H01M 4/505; H01M 4/525; H01M 10/0525; H01M 2004/021; H01M 2004/028; H01M 10/0404; H01M 4/13; H01M 4/139; Y02E 60/10

See application file for complete search history.

(56) References Cited

U.S. PATENT DOCUMENTS

| | | | |
|---|---|---|---|
| 2014/0335417 A1 | 11/2014 | Nagai | |
| 2018/0241036 A1 | 8/2018 | Jo et al. | |
| 2020/0313186 A1* | 10/2020 | Wang | H01M 4/625 |

FOREIGN PATENT DOCUMENTS

| | | | |
|---|---|---|---|
| CN | 109980177 A | | 7/2019 |
| EP | 3386009 A1 | | 10/2018 |
| JP | 2009-211956 A | | 9/2009 |
| JP | 2010-020986 A | | 1/2010 |
| JP | 2013-246900 A | | 12/2013 |
| JP | 2014-082116 A | | 5/2014 |
| JP | 2014-207201 A | | 10/2014 |
| JP | 2016-001575 A | | 1/2016 |
| JP | 2016-072110 A | | 5/2016 |
| JP | 2016-115567 A | | 6/2016 |
| JP | WO2017/057078 A1 | | 5/2018 |
| JP | 2019-149269 A | | 9/2019 |
| KR | 10-1324213 B1 | | 11/2013 |
| KR | 2015-0083025 A | | 7/2015 |
| KR | 10-1687190 B1 | | 12/2016 |
| KR | 10-2017-0103184 A | | 9/2017 |
| KR | 10-1792642 B1 | | 11/2017 |
| KR | 10-2012427 B1 | | 8/2019 |
| WO | 2017/057078 A1 | | 4/2017 |
| WO | WO2017057078 | * | 4/2017 |

OTHER PUBLICATIONS

Office Action issued in corresponding Chinese patent application No. 202180004595.6, dated Aug. 4, 2023.
Office Action issued in corresponding Japanese Patent Application No. 2022-503546 dated Jan. 30, 2023.
International Search Report (with partial translation) and Written Opinion dated Aug. 5, 2021 issued in corresponding International Patent Application No. PCT/KR2021/005217.

* cited by examiner

HIGH-NICKEL ELECTRODE SHEET HAVING REDUCED REACTIVITY WITH MOISTURE AND MANUFACTURING METHOD THEREFOR

TECHNICAL FIELD

This application claims the benefit of priority based on Korean Patent Application No. 10-2020-0054235 filed on May 7, 2020 and Korean Patent Application No. 10-2021-0049862 filed on Apr. 16, 2021, and the content of these Korean Patent Applications are incorporated herein as part of the present specification.

The present invention relates to an electrode sheet of a positive electrode containing a positive electrode active material having a high content of nickel, and a method of manufacturing the same, and more particularly, to an electrode sheet capable of suppressing reactivity with moisture by applying a slurry for a second positive electrode mixture including a positive electrode active material having a particle strength resistant to rolling at both edge regions of the electrode sheet coated part, to which moisture may be easily permeated during the storage of the electrode sheet, than the central portion of the coated part, and a method of manufacturing the electrode sheet.

BACKGROUND ART

In the lithium secondary battery, in a state that an organic electrolyte solution or a polymer electrolyte solution is charged in a space between a positive electrode and a negative electrode which are made of an active material in which lithium ions may be intercalated and deintercalated, electric energy is generated by oxidation and reduction reactions when lithium ions are intercalated/deintercalated in the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), lithium iron phosphate compound ($LiFePO_4$) and the like were used as the positive electrode active material of a lithium secondary battery. Further, as a method for improving a low thermal stability while maintaining the excellent reversible capacity of $LiNiO_2$, a lithium composite metal oxide (hereinafter, referred to as "NCM-based lithium composite transition metal oxide"), which was generated by substituting a part of nickel (Ni) with cobalt (CO) and manganese (Mn), was developed. However, the conventional NCM-based lithium composite transition metal oxide was not sufficient in capacity characteristics and thus has a limit in its application.

In order to improve such a problem, in recent years, research is conducted to increase the content of nickel in the NCM-based lithium composite transition metal oxide. As the content of nickel increases, the energy density per volume increases, but in the case of a high concentration nickel positive electrode active material, there is a problem that the structural stability and the chemical stability of the active material are low, which again rapidly deteriorates the thermal stability. Further, nickel ions react with moisture and carbon dioxide present in the storage environment, and irreversibly switched to NiO, and in this process, lithium ions exit, and lithium byproducts existing in the form of LiOH and $Li_2CO_3$ increase. As such, the resistance of the surface of the active material increases, the capacity of the battery decreases, and gas generation during high temperature storage increases.

Figure 1:
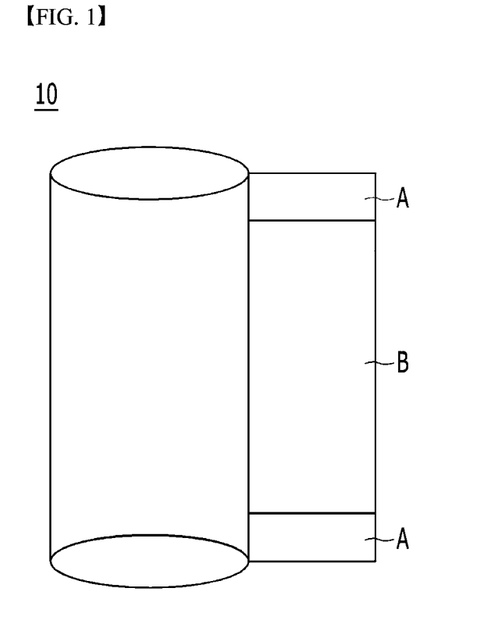
FIG. 1 is a schematic diagram of an electrode sheet in a wound state.

Generally, the electrode sheet, which is generated by applying a slurry for an electrode mixture including an electrode active material on a current collector sheet, and then performing a drying and rolling process, is stored in a wound state until punching the electrode for the assembly of a battery. FIG. 1 shows an electrode sheet 10 in a wound state for storage. At this time, moisture maybe more easily permeated into the both ends (A) than the central portion of the coated part, based on the width direction (arrow) of the electrode sheet, and thus the moisture content is high in the both ends (A). Therefore, in the case of a positive electrode sheet including a positive electrode active material of the NCM-based lithium composite transition metal oxide, the probability of reaction of nickel with moisture is higher in the both ends than in the central portion.

As such, when manufacturing a high-nickel positive electrode active material electrode having a high content of nickel, in order to relieve moisturization, Japanese Patent Publication No. 2019-149269 discloses a secondary battery including a positive electrode, in which a first positive electrode active material having a nickel content of 50 to 80% is applied in the center, and a second positive electrode active material a nickel content of 20 to 40% is applied at both ends. However, the conventional technology has the effect of suppressing the precipitation of lithium, but it is not sufficient for improving the lifespan of the battery, and the second positive electrode active material applied to both ends has the nickel content of only 20 to 40%, and thus it is difficult to implement the desired energy density.

Therefore, in a positive electrode having a high content of nickel, it is necessary to develop a battery capable of inhibiting reaction of moisture while implementing a high energy density.

DISCLOSURE

Technical Problem

The present invention has been created to solve the above problems, and it is an object of the present invention to provide an electrode sheet in the form that is wound by a roll, capable of mitigating the reaction of the positive electrode active material having a high nickel content with moisture while implementing a high energy density, and a manufacturing method thereof.

Technical Solution

An electrode sheet of the present invention for solving the above problems is an electrode sheet including a non-coated part and a coated part in which a positive electrode mixture layer is applied on at least one surface of a current collector, wherein the coated part includes: a first positive electrode mixture layer configured to be formed on a central portion along a longitudinal direction of the electrode sheet and to contain a positive electrode active material of lithium nickel oxide; and a second positive electrode mixture layer configured to be formed at one or two edges of the first positive electrode mixture layer and to contain a positive electrode active material of lithium nickel oxide, and wherein a particle strength of the positive electrode active material in the second positive electrode mixture layer is greater than a particle strength of the positive electrode active material in the first positive electrode mixture layer.

In one specific example, a width of the second positive electrode mixture layer corresponds to 1 to 15% of a width of the first positive electrode mixture layer.

In one specific example, positive electrode active materials, which are respectively contained in the first positive electrode mixture layer and the second positive electrode mixture layer, independently contain a compound represented by Chemical Formula 1 below:

$Li_aNi_{1-x-y}Co_xM1_yM2_wO_2$,     Chemical Formula 1 wherein $1.0 \leq a \leq 1.5$, $0 \leq x \leq 0.2$, $0 \leq y \leq 0.2$, $0 \leq w \leq 0.1$ and $0 \leq x+y \leq 0.4$, and wherein M1 contains one or two selected from a group consisting of Mn and Al, and M2 contains one or two or more selected from a group consisting of Ba, Ca, Zr, Ti, Mg, Ta, Nb and Mo.

In one specific example, a ratio B/A of the particle strength B of the positive electrode active material particle in the second positive electrode mixture layer to the particle strength A of the positive electrode active material in the first positive electrode mixture layer is in a range of 1.01 to 1.5.

In one specific example, the second positive electrode mixture layer contains a mixture of first positive electrode active materials having a relatively large average particle size $D_{50}$ and second positive electrode active materials having a relatively small average particle size $D_{50}$.

In one specific example, the average particle size $D_{50}$ of the first positive electrode active material is in a range of 9 μm to 30 μm, and the average particle size $D_{50}$ of the second positive electrode active material is less than 9 μm.

In one specific example, in the second positive electrode mixture layer, a mixing ratio of the first positive electrode active material and the second positive electrode active material is in a range of 95:5 to 65:35 based on a weight.

In one specific example, the positive electrode active material of the first positive electrode mixture layer may be made of the positive electrode active material having the same average particle size $D_{50}$.

At this time, the average particle size $D_{50}$ of the positive electrode active material of the first positive electrode mixture layer may be in a range of 9 μm to 30 μm.

In one specific example, the first positive electrode mixture layer may contain a mixture of first positive electrode active materials having a relatively large average particle size $D_{50}$ and second positive electrode active materials having a relatively small average particle size $D_{50}$.

At this time, the average particle size $D_{50}$ of the first positive electrode active material may be in a range of 9 μm to 30 μm, and the average particle size $D_{50}$ of the second positive electrode active material may be less than 9 μm.

At this time, a ratio (b/a) of a weight (b) of the second positive electrode active material to a weight (a) of the first positive electrode active material in the second positive electrode mixture layer is greater than a ratio (b'/a') of a weight (b') of the second positive electrode active material to a weight (a') of the first positive electrode active material in the first positive electrode mixture layer.

A lithium secondary battery of the present invention includes a positive electrode generated by cutting the coated part and the non-coated part of the electrode sheet according to a shape and a size of a unit electrode.

A method for manufacturing an electrode sheet according to the present invention includes: a slurry manufacturing process of manufacturing a slurry for a first positive electrode mixture and a slurry for a second positive electrode mixture, respectively; an applying process of applying the slurry for the first positive electrode mixture and the slurry for the second positive electrode mixture to thereby form a first positive electrode mixture layer and a second positive electrode mixture layer; a drying process; and a rolling process, wherein in the applying process, the slurry for the first positive electrode mixture has a predetermined width at a central portion of the electrode sheet based on a width direction of the electrode sheet and is applied in a longitudinal direction of the electrode sheet, and the slurry for the second positive electrode mixture has a predetermined width at an edge of one side or both sides of the slurry for the first positive electrode mixture and is applied in a longitudinal direction of the electrode sheet, and wherein the slurry for the second positive electrode mixture contains a mixture of first positive electrode active materials having a relatively large average particle size $D_{50}$ and second positive electrode active materials having a relatively small average particle size $D_{50}$.

In one specific example, in the applying process, a length of a width of the second positive electrode mixture layer corresponds to 1 to 15% of a length of a width of the first positive electrode mixture layer.

Advantageous Effects

According to the electrode sheet of the present invention, by including a positive electrode active material having a particle strength, which is greater than that of the first positive electrode mixture layer, in a second positive electrode mixture layer at both edges of the electrode sheet coated part which is easy to be exposed to moisture and where particles may be relatively easily broken due to the rolling roll of a worn structure, the reaction of the second positive electrode mixture layer with moisture after rolling is minimized, thereby improving lifespan characteristics of the battery.

Further, according to the electrode sheet of the present invention, capacity characteristics of the battery are improved by being applied to a high nickel positive electrode material having a high energy density.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

An electrode sheet according to an embodiment of the present invention is an electrode sheet including a non-coated part and a coated part in which a positive electrode mixture layer is applied on at least one surface of a current collector, wherein the coated part includes: a first positive electrode mixture layer configured to be formed on a central portion along a longitudinal direction of the electrode sheet and to contain a positive electrode active material of lithium nickel oxide; and a second positive electrode mixture layer configured to be formed at one or two edges of the first positive electrode mixture layer and to contain a positive electrode active material of lithium nickel oxide, and wherein a particle strength of the positive electrode active material in the second positive electrode mixture layer is greater than a particle strength of the positive electrode active material in the first positive electrode mixture layer.

Figure 2:
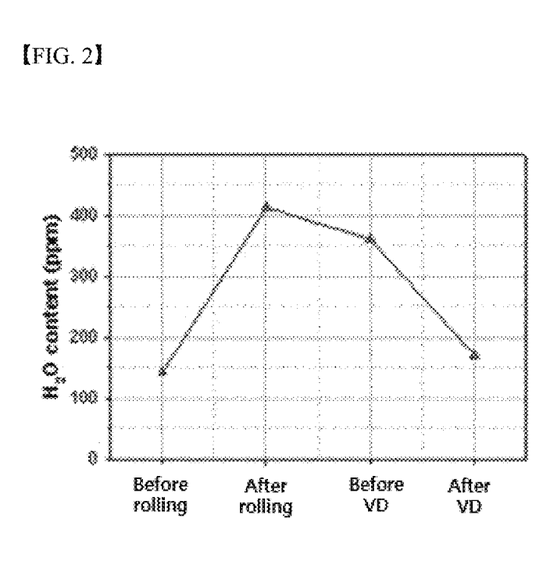
FIG. 2 is a graph showing a moisture content in an electrode according to an electrode manufacturing step.

FIG. 2 is a graph showing the moisture content in an electrode according to an electrode manufacturing step. Referring to this, it can be seen that the moisture content in the electrode is increased by a large width in the electrode immediately after the rolling process. This is because, as the electrode is rolled by a large force, the active material particles in the electrode layer are broken, thereby rapidly increasing the specific surface area of the active materials.

Figure 3:
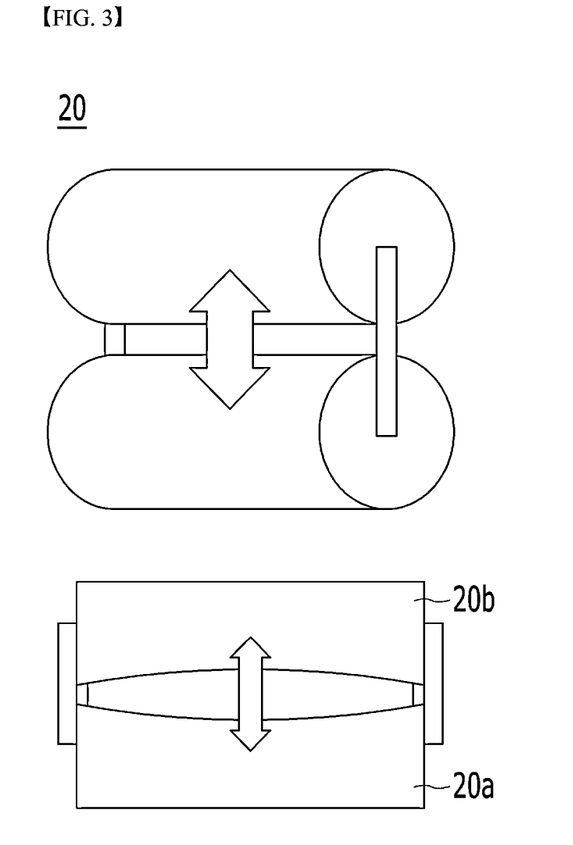
FIG. 3 is a schematic diagram showing a rolling roller having a wear generated at both ends, according to the increase in the number of times of usage.

Then, the rolling roller for rolling the electrode sheet may show a high rolling rate at both ends of the roller due to the structure, wear, etc. FIG. 3 shows the shape of the rolling roller 20 by wear. Herein, the central portion 20a of the roller has a structure which has been further worn compared to both ends 20b of the roller, and in the rolling roller having such a structure, the rolling rate at both ends may be greater than that in the central portion. As such, since more force is applied the region corresponding to both ends of the roller at the electrode sheet than the region corresponding to the central portion of the roller at the time of rolling, active material particles may be further broken, and it may become vulnerable to moisture by the increase of the specific surface area of the active material particles. Further, the region corresponds to both ends in the width direction in the electrode sheet which is wound by the roll for storage of the electrode sheet, and since the moisture penetration from the outside may be easy, moisture vulnerability may be further intensified.

Likewise, both ends in the width direction of the electrode sheet may easily contact moisture due to the position, compared to the central portion, and the rolling rate may be relatively high due to the influence of the worn rolling roller, and thus the reaction area between the active material and the moisture increases. Hence, when preparing a positive electrode or a positive electrode sheet having a high nickel content which is vulnerable to moisture, the reaction between nickel and moisture was minimized at both ends of the electrode sheet by including the positive electrode active material having a particle strength which is relatively strong against the rolling, compared to the central portion.

Figure 4:
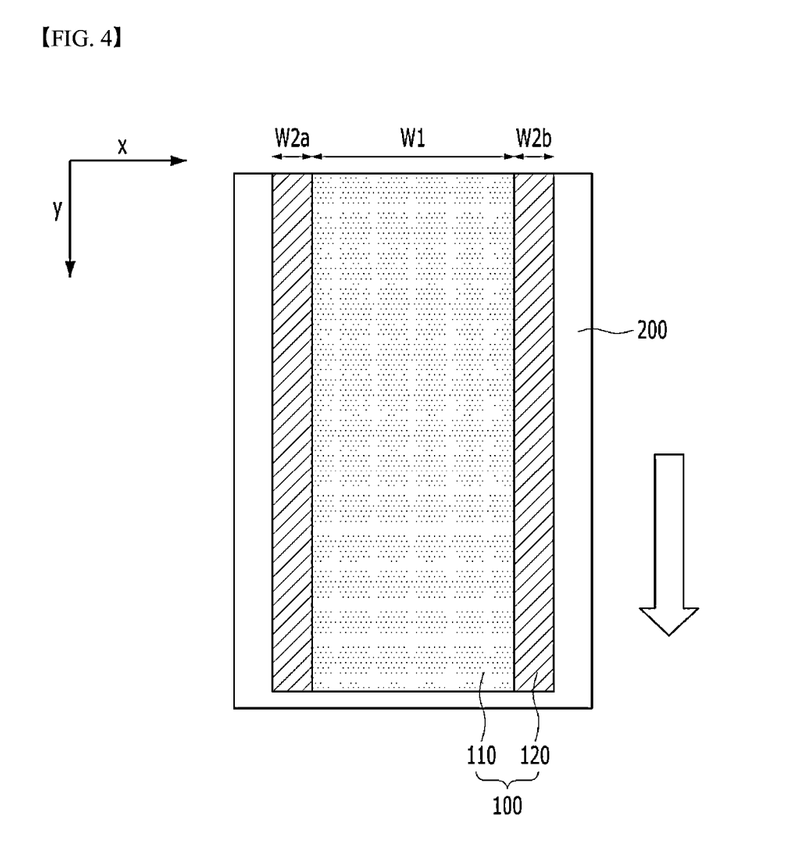
FIG. 4 is a planar schematic diagram illustrating an example of an electrode sheet according to an embodiment of the present invention.

Referring to FIG. 4, the electrode sheet of the present invention has a coated part 100 where the positive electrode active material layer has been applied on at least one surface of the current collector and a non-coated part 200. Further, the coated part 100 is formed of a first positive electrode mixture layer 110 formed on the central portion along the longitudinal direction (y axis) of the electrode sheet, and a second positive electrode mixture layer 120 formed at both ends of the first positive electrode mixture layer 110. Herein, both ends mean both side edges based on the width direction (x axis) of the electrode sheet. FIG. 4 illustrates an embodiment in which the second positive electrode mixture layer is formed at both edges of the first positive electrode mixture layer, but not limited thereto, and the second positive electrode mixture layer may be formed at one edge of the first positive electrode mixture layer.

In the electrode sheet of the present invention, the particle strength of the positive electrode active material included in the second positive electrode mixture layer is greater than the particle strength of the positive electrode active material in the first positive electrode mixture layer. Likewise, by including a positive electrode active material having a relatively large particle strength in the second positive electrode mixture layer, even if the size of the force applied to the second positive electrode mixture layer at the time of rolling by the wear of the rolling roller is greater than the size of the force applied to the first positive electrode mixture layer, the degree, by which the particles of the second positive electrode mixture layer are broken, becomes similar to or smaller than the degree, by which the particles of the first positive electrode mixture layer are broken, and thus the increase of the specific surface area of the active material particles is suppressed, thereby minimizing the reactivity with the moisture.

In the present invention, the particle strength may be defined as compression breaking strength. The positive electrode active material for a secondary battery goes through a rolling process as one of the manufacturing processes. The rolling process means pressing an active material layer several times with a predetermined pressure in order to increase density and crystallinity. During the rolling process, some positive electrode active material particles may be broken by the compression stress. When force is applied to the positive electrode active material particles, the particle strength can be quantified by measuring the force at the point of time when a crack is generated on the particles. For example, the particle strength may be a value which is obtained by measuring a point of time when cracks are generated in particles by applying pressure to a positive electrode active material with a force of 0.5 to 10 mN using a micro compression tester and converting a measured result into a value in a pressure unit (MPa).

In one specific example, the particle strength of the positive electrode active material of the second positive electrode mixture layer may be in a range of 30 to 300 MPa, preferably 40 to 200 MPa, and more preferably 50 to 150 MPa. Further, the particle strength of the positive electrode active material of the first positive electrode mixture layer may be in a range of 30 to 300 MPa, preferably 40 to 200 MPa, and more preferably 50 to 150 MPa, in a range smaller than the particle strength of the positive electrode active material of the second positive electrode mixture layer.

In one specific example, a ratio B/A of the particle strength B of the positive electrode active material in the second positive electrode mixture layer to the particle strength A of the positive electrode active material in the first positive electrode mixture layer may be in a range of 1 to 2.0, preferably 1.01 to 1.5, and more preferably 1.1 to 1.4.

In one specific example, the second positive electrode mixture layer contains a mixture of first positive electrode active materials having a relatively large average particle size $D_{50}$ and second positive electrode active materials having a relatively small average particle size $D_{50}$. In the second positive electrode mixture layer, which is generated by the mixture of positive electrode active materials of a large particle size and a small particle size, second positive electrode active materials of a small particle size are filled in pores formed by first positive electrode active material particles. As such this may become stronger against the same compression stress, compared to the case when formed only first positive electrode active material particles of a large particle size. In the present invention, by applying a blending system of the first positive electrode active material having a large particle size and the second positive electrode active material having a small particle size, to the second positive electrode mixture layer, the particle strength of the active material of the second positive electrode mixture layer is greater than the particle strength of the active material of the first positive electrode mixture layer.

In one specific example, the average particle size $D_{50}$ of the first positive electrode active material may be in a range of 9 to 30 μm, preferably 9 to 25 μm, and more preferably 10 to 20 μm, and the average particle size $D_{50}$ of the second positive electrode active material may be less than 9 μm, preferably in a range of 1 to 8 μm, and more preferably in a range of 2 to 7 μm.

In the present invention, the average particle diameter $D_{50}$ may be defined as a particle diameter corresponding to 50% of the volume accumulation amount in the particle diameter distribution curve. The average particle diameter $D_{50}$ may be measured using, for example, a laser diffraction method. For example, according the method of measuring the average particle size ($D_{50}$) of the positive electrode active material, after dispersing particles of the positive electrode active material in a dispersion medium, the ultrasonic waves of about 28 kHz are irradiated with the output of 60 W by introducing a commercially available laser diffraction particle size measuring apparatus (e.g., Microtrac MT 3000), and then the average particle size ($D_{50}$) corresponding to 50% of the volume accumulation amount in the measuring apparatus may be calculated.

In one specific example, positive electrode active materials, which are respectively contained in the first positive electrode mixture layer and the second positive electrode mixture layer, independently contain a compound represented by Chemical Formula 1 below:

$$Li_aNi_{1-x-y}Co_xM1_yM2_wO_2$$ [Chemical formula 1]

wherein 1.0≤a≤1.5, 0≤x≤0.2, 0≤y≤0.2, 0≤w≤0.1 and 0≤x+y≤0.4, and wherein M1 contains one or two selected from a group consisting of Mn and Al, and M2 contains one or two or more selected from a group consisting of Ba, Ca, Zr, Ti, Mg, Ta, Nb and Mo.

When the composition represented by the chemical Formula 1 is used, excellent capacity characteristics may be shown together with excellent structural stability.

Specifically, in the lithium nickel oxide represented by the above chemical formula 1, Li may be contained by the content corresponding to "a" where 1.0≤a≤1.5. If "a" is less than 1.0, the capacity may be lowered, and if it exceeds 1.5, the particles may be sintered in the forming step, and the production of active material may be difficult. When considering the significance of the effect of improving the capacity characteristics of the positive electrode active material according to the Li content control and the balance in sinterability at the time of manufacturing the active material, the Li may be specifically contained by the amount of 1.0≤a≤1.2, and more specifically by the amount of 1.0≤a≤1.15.

In the lithium nickel oxide represented by the chemical formula 1, Ni may be included by the content corresponding to 1−x−y, namely, the content corresponding to 0.6≤1−x−y≤1. If the (1−x−y) is less than 0.6, the capacity characteristics may be lowered, and if (1−x−y) is greater than 1, the high temperature stability may be lowered. When considering the significance of capacity characteristic improvement effect according to whether Ni is contained, Ni may be contained specifically by the content corresponding to 0.8≤1−x−y<1, and more specifically by the content corresponding to 0.8≤1−x−y<0.95.

In the lithium nickel oxide represented by the above chemical formula 1, M1 may be at least one selected from the group consisting of Al and Mn and may be, more specifically, Al or Mn. The M1 may be included in the content corresponding to y in which 0≤y≤0.2. If y exceeds 0.2, the output characteristics and capacity characteristics of the battery may be lowered. When considering the significance of the battery characteristic improvement effect according to the inclusion of the M1 element, the M1 may be contained specifically by the content corresponding to 0<y≤0.2, and more specifically by the content corresponding to 0.05≤y≤0.2.

Further, elements of Ni, Co and M1 at the lithium nickel oxide indicated by the chemical Formula 1 may be substituted or doped by another element, that is, M2 for improvement of battery characteristics through the distribution adjustment of the metal element in the active material. M2 may be one or more selected from a group consisting of Ba, Ca, Zr, Ti, Mg, Ta, Nb and Mo, and more preferably Zr or Ti. The element of the M2 may be included within the range which does not lower the characteristics of the positive electrode active material, namely, by the content corresponding to 0≤w≤0.1. Specifically, the M2 may be contained by the content corresponding to 0<w≤0.1, and more specifically by the content corresponding to 0<w≤0.02.

In one specific example, the length of the width of the second positive electrode mixture layer corresponds to 1 to 15%, preferably 2 to 13%, and more preferably 3 to 10% of the length of the width of the first positive electrode mixture layer. Referring to FIG. 4, the width length W2 of the second positive electrode mixture layer may be defined as the sum of the width length W2a of the second positive electrode mixture layer of the left edge of the coated part and the width length W2b of the second positive electrode mixture layer of the right edge of the coated part, and the sum (W2a+W2b) may correspond to 1 to 15% of the width length W1 of the first positive electrode mixture layer. When the width length of the second positive electrode mixture layer satisfies the numerical range, it is preferable in implementing a high energy density while inhibiting the reaction of the nickel in the positive electrode active material with moisture.

In one specific example, in the second positive electrode mixture layer, the mixing ratio of the first positive electrode active material and the second positive electrode active material may be 95:5 to 65:35, preferably 90:10 to 70:30, and more preferably 85:15 to 75:25, based on the weight. If the rate of the first positive electrode active material is greater than 95%, it is not possible for the second positive electrode active material fully to fill the pores formed by the first positive electrode active material, and if the rate of the second positive electrode active material is greater than 35%, the specific surface area may increase due to the extra second positive electrode active material which remains after filling the pores.

First Embodiment

In the electrode sheet according to the first embodiment of the present invention, the second positive electrode mixture layer includes the first positive electrode active material and the second positive electrode active material, and the first positive electrode mixture layer may be formed of positive electrode active materials having the same average particle size $D_{50}$.

At this time, the average particle size $D_{50}$ of the positive electrode active material of the first positive electrode mixture layer may be in a range of 9 to 30 μm, preferably 9 to 25 μm, and more preferably 10 to 20 μm. Further, it may be the same as the average particle size of the first positive electrode active material of the second positive electrode mixture layer.

Second Embodiment

In the electrode sheet according to a second embodiment of the present invention, the second positive electrode mixture layer may include the first positive electrode active material and the second positive electrode active material, and the first positive electrode mixture layer may include a mixture of the first positive electrode active material having a large particle size and the second positive electrode active material having a small particle size as in the second positive electrode mixture layer.

At this time, in order for the second positive electrode mixture layer to become relatively stronger in rolling than the first positive electrode mixture layer, a ratio (b/a) of a weight (b) of the second positive electrode active material to a weight (a) of the first positive electrode active material in the second positive electrode mixture layer is greater than a ratio (b'/a') of a weight (b') of the second positive electrode active material to a weight (a') of the first positive electrode active material in the first positive electrode mixture layer. As designed in this way, since the ratio, by which the second positive electrode active materials having relatively a small particle size are filled in an empty space in the pore formed by first positive electrode active materials having relatively a large particle size in the second positive electrode mixture layer, is greater than the ratio, by which second positive electrode active materials are fill in an empty space in the pore formed by the first positive electrode active materials in the first positive electrode mixture layer, the second positive electrode mixture layer becomes stronger against rolling than the first positive electrode mixture layer.

At this time, the mixing ratio of particles of the first positive electrode active material having a large particle size and particles of the second positive electrode active material having a small particle size may be in a range of 95:5 to 65:35, preferably 90:10 to 70:30, and more preferably 85:15 to 75:25, based on the weight.

Further, the average particle size $D_{50}$ of the first positive electrode active material contained in the second positive electrode mixture layer may 9 to 30 μm, preferably 9 to 25 μm, and more preferably 10 to 20 μm, and the average particle size $D_{50}$ of the second positive electrode active material may be less than 9 μm, preferably in a range of 1 to 8 μm, and more preferably 2 to 7 μm.

Hereinafter, a lithium secondary battery of the present invention will be described. A lithium secondary battery of the present invention includes a positive electrode generated by cutting the coated part and the non-coated part of the electrode sheet according to a shape and a size of a unit electrode.

The positive electrode includes a positive electrode current collector and a first positive electrode mixture layer and a second positive electrode mixture layer formed on the positive electrode current collector.

The positive electrode current collector is not particularly limited as long as it has conductivity without causing a chemical change in a battery. Examples of the positive electrode current collector include stainless steel, aluminum, nickel, titanium, sintered carbon or aluminum or stainless steel of which the surface has been treated with carbon, nickel, titanium, silver, or the like. Further, the positive electrode current collector may generally have a thickness of 3 to 500 μm, and it is possible to increase the adhesive force of the positive electrode active material by forming minute irregularities on the surface of the positive electrode current collector. It may be used as various forms such as a film, a sheet, a foil, a net, a porous body, a foam, and a nonwoven fabric.

The first positive electrode mixture layer may include a conductive material and a binder together with the above-described positive electrode active material, and the second positive electrode mixture layer may also include a conductive material and a binder together with the above-described positive electrode active material.

The conductive material is used to give conductivity to the electrode, and any conductive material may be used without limitation as long as it has electric conductivity and does not cause a chemical change in the battery. Some examples of the conductive material include: graphite such as natural graphite and artificial graphite; a carbon-based material such as carbon black, acetylene black, ketjen black, channel black, furnace black, lamp black, summer black, or carbon fiber; metal powders or metal fibers such as cooper, nickel, aluminum or silver; conductive whiskey such as zinc oxide and potassium titanate; conductive metal oxides such as titanium oxide; conducting polymers such as polyphenylene derivatives, and one or a mixture thereof may be used. The conductive material may generally be included in a 1 to 30% by weight based on the total weight of the positive electrode material layer.

The binder improves the adhesive force between the positive electrode active material and the positive electrode current collector and attachment between positive electrode active material particles. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene polymer (EPDM), sulfonated-EPDM, styrene butadiene rubber (SBR), fluororubber, or various copolymers thereof, and one kind or a mixture of two or more kinds of them may be used. The binder may be included in a 1 to 30% by weight based on the total weight of the positive electrode material layer.

The positive electrode may be manufactured according to a general positive electrode manufacturing method except that the first positive electrode mixture layer is applied on the central portion, and the second positive electrode mixture layer is applied on both edges using a dual slot-die coater by using the positive electrode active material, and the composition of the first positive electrode mixture layer and the second positive electrode mixture layer is different. Specifically, it may be manufactured by supplying a positive electrode slurry for formation of a positive electrode mixture layer including the positive electrode active material and selectively a binder and a conductive material to a dual slot-die coater, applying the positive electrode slurry on the positive electrode current collector using the dual slot-die coater, and drying and rolling the positive electrode current collector. At this time, the type and the content of the positive electrode material, the binder, and the conductive material are as described above.

The solvent of the positive electrode slurry may be a solvent generally used in the art, such as dimethyl sulfoxide (DMSO), isopropyl alcohol, N-methylpyrrolidone (NMP), acetone, or water, and one of them alone or a mixture of two or more may be used. The amount of use of the solvent is sufficient if it can dissolve or disperse the positive electrode active material, the conductive material and the binder in consideration of the application thickness and production yield, and later allow a viscosity for showing an excellent thickness uniformity at the time of application for preparation of a positive electrode.

Specifically, the lithium secondary battery includes a positive electrode, a negative electrode facing against the positive electrode, a separator interposed between the positive electrode and the negative electrode, and an electrolyte, and the positive electrode has been described above. Further, the lithium secondary battery may selectively further include a battery case for accommodating the electrode assembly of the positive electrode, the negative electrode and the separator, and a sealing member for sealing the battery case.

The negative electrode current collector is not particularly limited as long as it has high electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. Further, the negative electrode current collector may generally have a thickness of 3 to 500 µm, and may strengthen the coupling force of the negative electrode active material by forming minute irregularities on the surface of the current collector as in the positive electrode current collector. It may be used as various forms such as a film, a sheet, a foil, a net, a porous body, a foam, and a nonwoven fabric.

The negative electrode mixture layer includes a negative electrode active material, and selectively a binder, and a conductive material. The negative electrode mixture layer may be manufactured by applying a slurry for forming a negative electrode containing a negative electrode active material and selectively a binder and a conductive material on a negative electrode current collector and drying them, or by casting the slurry for forming the negative electrode on a separate support and then laminating a film, obtained by peeling the slurry from the support on the negative electrode current collector.

A compound, in which a reversible intercalation and deintercalation of lithium is possible, may be used as the negative electrode active material. Specific examples thereof include carbonaceous materials such as artificial graphite, natural graphite, graphitized carbon fiber and amorphous carbon; A metal compound capable of alloying with lithium such as Si, Al, Sn, Pb, Zn, Bi, In, Mg, Ga, Cd, Si alloy, Sn alloy or Al alloy; Metal oxides such as $SiO_x$ (0<x<2), $SnO_2$, vanadium oxide, and lithium vanadium oxide that can dope and dedope lithium; or a composite containing the above-described metallic compound and a carbonaceous material such as a Si—C composite or a Sn—C composite, and any one or a mixture of two or more of them. In addition, a metal lithium thin film may be used as the negative electrode active material. As the carbon material, both low-crystalline carbon and high-crystalline carbon may be used. Examples of the low-crystalline carbon include soft carbon and hard carbon. Examples of the highly crystalline carbon include amorphous, flaky, scaly, spherical or fibrous natural graphite natural graphite or artificial graphite, Kish graphite, pyrolytic carbon, mesophase pitch based carbon fiber, mesocarbon microbeads, mesophase pitches and high-temperature calcined carbon, such as petroleum or coal tar pitch derived cokes.

In addition, the binder and the conductive material may be the same as described in the positive electrode previously.

Meanwhile, in the lithium secondary battery, the separator is used to separate the negative electrode from the positive electrode and provide a moving path of lithium ions, and any separator generally used in a lithium secondary battery may be used without any special limitation. In particular, a separator having a high electrolyte solution moisturization capability and a low resistance to ion movement of electrolyte solution is preferred. Specifically, porous polymer films, for example, porous polymer films made of polyolefin-based polymers such as ethylene homopolymers, propylene homopolymers, ethylene/butene copolymers, ethylene/hexene copolymers and ethylene/methacrylate copolymers, or a laminate of two or more thereof may be used. Further, a nonwoven fabric made of a conventional porous nonwoven fabric, for example, glass fiber of high melting point, polyethylene terephthalate fiber, or the like may be used. In order to secure heat resistance or mechanical strength, a coated separator containing a ceramic component or a polymer material may be used, and may be optionally used as a single layer or a multilayer structure.

Examples of the electrolyte used in the present invention include an organic liquid electrolyte, an inorganic liquid electrolyte, a solid polymer electrolyte, a gel polymer electrolyte, a solid inorganic electrolyte, and a molten inorganic electrolyte which can be used in the production of a lithium secondary battery, but the present invention is not limited to these examples.

Specifically, the electrolyte may include an organic solvent and a lithium salt.

The organic solvent may be any organic solvent that can act as a medium through which ions involved in an electrochemical reaction of a battery can move. Specifically, examples of the organic solvent include ester solvents such as methyl acetate, ethyl acetate, γ-butyrolactone and ε-caprolactone; ether solvents such as dibutyl ether or tetrahydrofuran; ketone solvents such as cyclohexanone; aromatic hydrocarbon solvents such as benzene and fluorobenzene; carbonate solvents such as dimethyl carbonate (DMC), diethylcarbonate (DEC), methylethylcarbonate (MEC), ethylmethylcarbonate (EMC), ethylene carbonate (EC), and propylene carbonate (PC); alcohol solvents such as ethyl alcohol and isopropyl alcohol; nitriles such as R—CN (R is a straight, branched or cyclic hydrocarbon group of C2 to C20, which may contain a double bond aromatic ring or ether bond); amides such as dimethylformamide; dioxolanes such as 1,3-dioxolane; or sulfolane. Among them, a carbonate-based solvent is preferable, and a mixture of a cyclic carbonate (for example, ethylene carbonate or propylene carbonate) having a high ionic conductivity and a high dielectric constant which can increase the charge/discharge performance of a battery, and a linear carbonate compound having a low viscosity (for example, ethyl methyl carbonate, dimethyl carbonate or diethyl carbonate) is more preferable. In this case, when the cyclic carbonate and the chain carbonate are mixed in a volume ratio of about 1:1 to about 1:9, the performance of the electrolytic solution may be excellent.

The lithium salt can be used without any particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used as the lithium salt. The concentration of the lithium salt is preferably within the range of 0.1 to 2.0 M. When the concentration of the lithium salt is within the above range, the electrolyte has an appropriate conductivity and viscosity, so that it can exhibit excellent electrolyte performance and the lithium ions can effectively move.

In addition to the electrolyte components, in order to improve the life characteristics of the battery, inhibit the battery capacity reduction, and improve the discharge capacity of the battery, the electrolyte may contain one or more additives, such as a haloalkylene carbonate-based compound such as difluoroethylene carbonate, pyridine, triethyl phosphite, triethanolamine, cyclic ether, ethylene diamine, n-glyme, and hexa phosphate triamide, nitrobenzene derivative, sulfur, quinone imine dye, N-substituted oxazolidinone, N, N-substituted imidazolidine, ethylene glycol dialkyl ether, ammonium salt, pyrrole, 2-methoxy ethanol or, aluminum trichloride. Herein, The additive may be included in an amount of 0.1 wt % to 5 wt % based on the total weight of the electrolyte.

Lithium secondary batteries including a positive electrode according to the present invention are useful for portable devices such as mobile phones, laptop computers, and digital cameras and electric cars such as hybrid electric vehicles because the lithium secondary batteries stably show excellent discharge capacity, output characteristics, and capacity retention rate.

According to another embodiment of the present invention, there is provided a battery module including the lithium secondary battery as a unit cell and a battery pack including the same. The battery module or the battery pack may be used as a middle or large size device power source of one or more of a power tool; an electric vehicle including an electric vehicle (EV), a hybrid electric vehicle, and a plug-in hybrid electric vehicle (PHEV); or a system for power storage.

Hereinafter, a method of manufacturing an electrode sheet according to the present invention will be described.

A method for manufacturing an electrode sheet according to an embodiment of the present invention includes: a slurry manufacturing process of manufacturing a slurry for a first positive electrode mixture and a slurry for a second positive electrode mixture, respectively; an applying process of applying the slurry for the first positive electrode mixture and the slurry for the second positive electrode mixture to thereby form a first positive electrode mixture layer and a second positive electrode mixture layer; a drying process; and a rolling process, wherein in the applying process, the slurry for the first positive electrode mixture has a predetermined width at a central portion of the electrode sheet based on a width direction of the electrode sheet and is applied in a longitudinal direction of the electrode sheet, and the slurry for the second positive electrode mixture has a predetermined width at an edge of one side or both sides of the slurry for the first positive electrode mixture and is applied in a longitudinal direction of the electrode sheet.

Herein, the slurry for the second positive electrode mixture contains a mixture of first positive electrode active materials having a relatively large average particle size $D_{50}$ and second positive electrode active materials having a relatively small average particle size $D_{50}$.

Specifically, the slurry for the second positive electrode mixture includes a first positive electrode active material having an average particle size $D_{50}$ of 9 to 30 μm, and a second positive electrode active material having an average particle size $D_{50}$ of less than 9 μm. When manufacturing a slurry for a second positive electrode mixture, by including a first positive electrode active material having a large particle size and a second positive electrode active material having a small particle size, the particle strength of the positive electrode active material in the second positive electrode mixture layer may be set to be greater than the particle strength of the positive electrode active material in the first positive electrode mixture layer.

In one desirable embodiment, the mixing ratio of the first positive electrode active material particles having a large particle size and the second positive electrode active material particles having a small particle size is in a range of 95:5 to 65:35, preferably 90:10 to 75:25, and more preferably 85:15 to 70:30. When the mixing ratio of the first positive electrode active material particles and the second positive electrode active material particles is in the above numerical value range, it is easy to control the particle strength of the positive electrode active material in the second positive electrode mixture layer to be made to be greater than that in the first positive electrode mixture layer.

At this time, the positive electrode active material contained in the slurry for the first positive electrode mixture may be formed of the positive electrode active material having the same average particle size $D_{50}$, or may contain the first positive electrode active material having a relatively large average particle size $D_{50}$, and the second positive electrode active material having a relatively small average particle size $D_{50}$.

In one specific example, in the applying process, a length of a width of the second positive electrode mixture layer preferably corresponds to 1 to 15% of a length of a width of the first positive electrode mixture layer.

Hereinafter, embodiments of the present invention will be described in detail so that those skilled in the art can easily carry out the present invention. The present invention may, however, be embodied in many different forms and should not be construed as limited to the embodiments set forth herein.

EXAMPLE 1

(Preparation of First Positive Electrode Slurry for Formation of First Positive Electrode Mixture Layer)

A first positive electrode active material ($D_{50}$ is 11 μm) containing the nickel content of 80 mol % based on the total transition metal as the transition metal oxide of lithium-nickel-cobalt-manganese was prepared, which was then mixed with the carbon black conductive material and PVDF binder at the weight ratio of 96.5:1.5:2 in the solvent of N-methyl pyrrolidone, to thereby manufacture a first positive electrode slurry (viscosity: 7000 Pa·s).

(Preparation of Second Positive Electrode Slurry for Formation of Second Positive Electrode Mixture Layer)

A positive electrode active material was prepared by mixing a first positive electrode active material ($D_{50}$ is 11 μm), in which the content of nickel corresponds to 80 mol % based on the total transition metal, as a transition metal oxide of lithium-nickel-cobalt-manganese, and a second positive electrode active material ($D_{50}$ is 6 μm), in which the content of nickel corresponds to 80 mol % based on the total transition metal, as a transition metal oxide of lithium-nickel-cobalt-manganese at the ratio of 8:2, and a carbon black conductive material and a PVDF binder were mixed in N-methylpyrrolidone solvent at the ratio of 96.5:1.5:2, to thereby prepare a second positive electrode slurry (viscosity: 7000 Pa·s).

(Preparation and Storage of Positive Electrode Sheet)

The first positive electrode slurry and the second positive electrode slurry were supplied to the dual slot-die coater, and then the first positive electrode mixture layer and the second positive electrode mixture layer were formed by applying the first positive electrode slurry and the second positive electrode slurry on one surface of the aluminum current collector sheet using the coater. At this time, the first positive electrode slurry was set to be applied on the coated portion of the slurry coating portion, and the second positive electrode slurry was set to be applied on both edge regions of the coating portion of the first positive electrode slurry. The total sum of the width length of the coating portion of the second positive electrode slurry was set to correspond to 8% of the width length of the coating portion of the first positive electrode slurry.

Thereafter, a positive electrode sheet including a first positive electrode mixture layer and a second positive electrode mixture layer was dried at 130° C., and rolled.

Likewise, the prepared positive electrode sheet was wound in the form of a roll, which was then stored in a room temperature of 25° C. for 7 days, and then a positive electrode tab was notched in the non-coated part of the positive electrode sheet, and the positive electrode sheet was slitted, to thereby manufacture a positive electrode.

Battery Preparation

A porous polyolefin separator was interposed between the positive electrode and lithium metal as the negative electrode, to thereby prepare an electrode assembly, which was then located inside a case, and an electrolyte solution was injected into the case, to thereby manufacture a lithium secondary battery. At this time, lithium hexafluorophosphate (LiPF$_6$) of 1.0 M concentration was dissolved in an organic solvent consisting of ethylene carbonate/dimethyl carbonate/ethyl methylcarbonate (EC/DMC/EMC volume ratio=3/4/3) to manufacture the electrolyte solution.

EXAMPLE 2

A battery was manufactured in the same method as in example 1 except that the first positive electrode active material and the second positive electrode active material were mixed at the ratio of 85:15 when preparing a second positive electrode slurry.

EXAMPLE 3

A battery was manufactured in the same method as in example 1 except that the first positive electrode active material and the second positive electrode active material were mixed at the ratio of 75:25 when preparing a second positive electrode slurry.

EXAMPLE 4

A battery was manufactured in the same manner as in the above example 1, except that the first positive electrode slurry was manufactured as follows.
(Preparation of First Positive Electrode Slurry for Formation of First Positive Electrode Mixture Layer)
A positive electrode active material was prepared by mixing a first positive electrode active material (D$_{50}$ is 11 μm), in which the content of nickel corresponds to 80 mol % based on the total transition metal, as a transition metal oxide of lithium-nickel-cobalt-manganese, and a second positive electrode active material (D$_{50}$ is 6 μm), in which the content of nickel corresponds to 80 mol % based on the total transition metal, as a transition metal oxide of lithium-nickel-cobalt-manganese at the ratio of 9:1, and a carbon black conductive material and a PVDF binder were mixed in N-methylpyrrolidone solvent at the ratio of 96.5:1.5:2, to thereby prepare a first positive electrode slurry (viscosity: 7000 Pa·s).

Comparative Example 1

A slurry for formation of a positive electrode was manufactured in the same manner and with the same materials as in the preparation of the first positive electrode slurry of the example 1. A positive electrode mixture layer was formed by applying the slurry for formation of the positive electrode on the aluminum current collector using a single slot-die coater.

Thereafter, a battery was prepared in the same manner as in Example 1.

Comparative Example 2

A battery was manufactured in the same manner as in the example 1 except that the first positive electrode slurry and the second positive electrode slurry were prepared as follows.
(Preparation of First Positive Electrode Slurry for Formation of First Positive Electrode Mixture Layer)
A positive electrode active material was prepared by mixing a first positive electrode active material (D$_{50}$ is 11 μm), in which the content of nickel corresponds to 80 mol % based on the total transition metal, as a transition metal oxide of lithium-nickel-cobalt-manganese, and a second positive electrode active material (D$_{50}$ is 6 μm), in which the content of nickel corresponds to 80 mol % based on the total transition metal, as a transition metal oxide of lithium-nickel-cobalt-manganese at the ratio of 7:3, and a carbon black conductive material and a PVDF binder were mixed in N-methylpyrrolidone solvent at the ratio of 96.5:1.5:2, to thereby prepare a first positive electrode slurry (viscosity: 7000 Pa·s).
(Preparation of Second Positive Electrode Slurry for Formation of Second Positive) Electrode Mixture Layer
A positive electrode active material was prepared by mixing a first positive electrode active material (D$_{50}$ is 11 μm), in which the content of nickel corresponds to 80 mol % based on the total transition metal, as a transition metal oxide of lithium-nickel-cobalt-manganese, and a second positive electrode active material (D$_{50}$ is 6 μm), in which the content of nickel corresponds to 80 mol % based on the total transition metal, as a transition metal oxide of lithium-nickel-cobalt-manganese at the ratio of 8:2, and a carbon black conductive material and a PVDF binder were mixed in N-methylpyrrolidone solvent at the ratio of 96.5:1.5:2, to thereby prepare a second positive electrode slurry (viscosity: 7000 Pa·s).

Experimental Example 1: Measurement of Particle Strength

In examples 1 to 4 and comparative examples 1 to 2, the pressure of 100 mN was applied to each of the positive electrode active material in the first positive electrode mixture layer and the positive electrode active material in the second positive electrode mixture layer, for 1 minute, and the force at the time when particles were broken was measured to thereby compare the sizes of the particle strengths. Then the result was shown in Table 1. When the particle strength of the positive electrode active material of the second positive electrode mixture layer was greater than the particle strength of the first positive electrode mixture layer, it was indicated by "O", and when the particle strength of the positive electrode active material of the second positive electrode mixture layer was equal to or smaller than the particle strength of the first positive electrode mixture layer, it was indicated by "X".

Experimental Example 2: Evaluation of Capacity and Life Characteristics

The initial (first) charge/discharge was performed using the electrochemical charge-discharge device for the lithium secondary battery of examples 1 to 4 a comparative examples 1 to 2. At this time, the charge was performed by applying electric current with the current density of 0.33 C-rate until reaching the voltage of 4.2 V, and the discharge was performed with the same current density until reaching 2.5 V. This charge/discharge was carried out a total of 500 times.

The capacity of each battery was measured in the charge/discharge process as described above.

Figure 5:
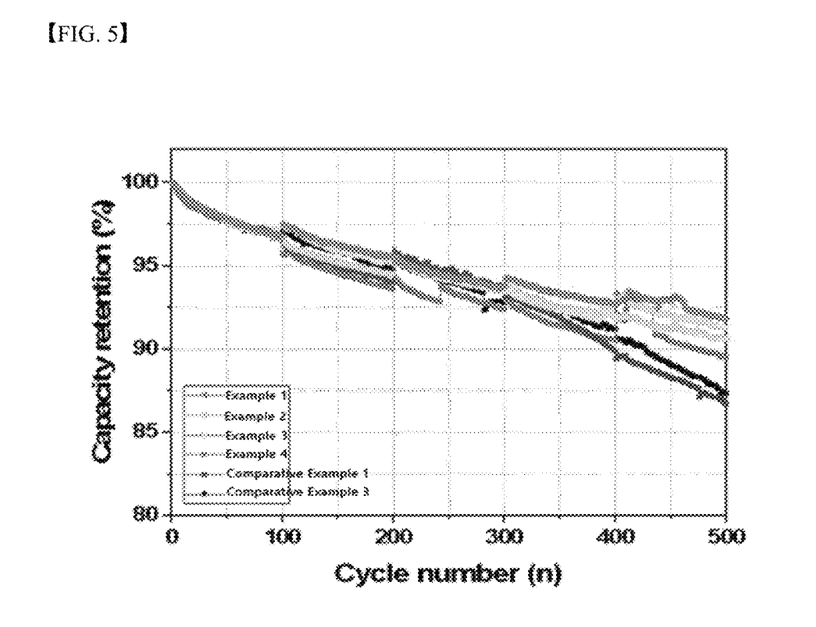
FIG. 5 is a graph showing results of measuring capacity retention rates according to the charge/discharge cycle for batteries of embodiments and comparative examples.

From this, the capacity retention rate of each battery is calculated as follows, and the results are shown in Table 1, and the change in the capacity retention rate according to the cycle is shown in FIG. 5.

Capacity retention rate (%)=(capacity in $N$ cycles/initial capacity)×100

TABLE 1

| | Is particle strength of active material of second positive electrode mixture layer greater than particle strength of active material of first positive electrode mixture layer? | Capacity retention rate in 500 cycles (%) |
|---|---|---|
| Example 1 | O | 91.9 |
| Example 2 | O | 90.6 |
| Example 3 | O | 91.2 |
| Example 4 | O | 89.0 |
| Comparative Example 1 | X | 87.5 |
| Comparative Example 2 | X | 87 |

Referring to Table 1 and FIG. 5, the secondary battery according to an embodiment of the present invention has an excellent capacity retention rate compared to the battery in the comparative example. This seems to be possible by suppressing the reactivity of nickel with moisture by differently adjusting the particle strength of each positive electrode active material included in the first positive electrode mixture layer and the second positive electrode mixture layer relatively vulnerable to the moisture exposure in a positive electrode to which the positive electrode active material of the lithium nickel oxide is applied.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

The invention claimed is:

1. An electrode sheet including a positive electrode mixture layer and a current collector,
   wherein the current collector comprises: a non-coated part on which the positive electrode mixture layer is not coated; and a coated part on which the positive electrode mixture layer is applied, on at least one surface of the current collector,
   wherein the positive electrode mixture includes:
   a first positive electrode mixture layer disposed on a central portion of the current collector along a longitudinal direction of the electrode sheet and containing lithium nickel oxide; and
   a second positive electrode mixture layer disposed adjacent to one or two sides of the first positive electrode mixture layer such that the second positive electrode mixture layer is disposed next to the non-coated part,
   second positive electrode mixture layer contains lithium nickel oxide, and
   a particle strength of particles included in the second positive electrode mixture layer is greater than a particle strength of particles in the first positive electrode mixture layer,
   the particles in the first positive electrode mixture layer contains a first positive electrode active material having an average particle size $D_{50}$ of 9 μm to 30 μm, and
   the particles in the second positive electrode mixture layer contains a mixture of the first positive electrode active material having an average particle size $D_{50}$ of 9 μm to 30 μm and a second positive electrode active material having an average particle size $D_{50}$ of less than 9 μm.

2. The electrode sheet of claim 1, wherein a width of the second positive electrode mixture layer is 1 to 15% of a width of the first positive electrode mixture layer.

3. The electrode sheet of claim 1, wherein the first positive electrode mixture layer and the second positive electrode mixture layer independently contain a compound represented by Chemical Formula 1 below:

$Li_aNi_{1-x-y}Co_xM1_yM2_wO_2$,  [Chemical formula 1]

wherein 1.0≤a≤1.5, 0≤x≤0.2, 0≤y≤0.2, 0≤w≤0.1 and 0≤x+y≤0.4, and
wherein M1 is one or two selected from a group consisting of Mn and Al, and M2 is one or two or more selected from a group consisting of Ba, Ca, Zr, Ti, Mg, Ta, Nb and Mo.

4. The electrode sheet of claim 1, wherein a ratio B/A of a particle strength B of the particles in the second positive electrode mixture layer to a particle strength A of the particles in the first positive electrode mixture layer is in a range of 1.01 to 1.5.

5. The electrode sheet of claim 1, wherein in the second positive electrode mixture layer, a mixing weight ratio of the first positive electrode active material to the second positive electrode active material is in a range of 95:5 to 65:35.

6. The electrode sheet of claim 1, wherein the first positive electrode mixture layer contains a mixture of the first positive electrode active material and the second positive electrode active material.

7. The electrode sheet of claim 6, wherein a ratio (b/a) of a weight (b) of the second positive electrode active material to a weight (a) of the first positive electrode active material in the second positive electrode mixture layer is greater than a ratio (b'/a') of a weight (b') of the second positive electrode active material to a weight (a') of the first positive electrode active material in the first positive electrode mixture layer.

8. A lithium secondary battery including a positive electrode generated by cutting the coated part and the non-coated part of the electrode sheet according to claim 1, according to a shape and a size of a unit electrode.

9. A method of manufacturing the electrode sheet according to claim 1, comprising:

manufacturing a slurry for a first positive electrode mixture and a slurry for a second positive electrode mixture, respectively;

applying the slurry for the first positive electrode mixture and the slurry for the second positive electrode mixture to thereby form the first positive electrode mixture layer and a second positive electrode mixture layer;

a drying; and a rolling, wherein in the applying, the slurry for the first positive electrode mixture is applied in a longitudinal direction of the electrode sheet to have a predetermined width of the first positive electrode mixture layer at a central portion of the electrode sheet based on a width direction of the electrode sheet, and the slurry for the second positive electrode mixture is applied in a longitudinal direction of the electrode sheet to have a predetermined width of the second positive electrode mixture layer at an edge of one side or both sides of the slurry for the first positive electrode mixture and, and wherein the slurry for the second positive electrode mixture contains a mixture of the first positive electrode active material having a relatively large average particle size $D_{50}$ and the second positive electrode active material having a relatively small average particle size $D_{50}$.

10. The method of claim 9, wherein in the applying, the predetermined width of the second positive electrode mixture layer is 1 to 15% of the predetermined width of the first positive electrode mixture layer.

11. The electrode sheet of claim 1, wherein the second positive electrode mixture layer is disposed adjacent to the two sides of the first positive electrode mixture layer.

12. The electrode sheet of claim 1, wherein the average particle size $D_{50}$ of the particles in the first positive electrode active material is in a range of 10 μm to 20 μm.

13. The electrode sheet of claim 1, wherein the average particle size $D_{50}$ of the second positive electrode active material is in a range of 1 μm to 8 μm.

14. The electrode sheet of claim 3, wherein, in Chemical Formula 1, $0.8 \leq 1-x-y<1$.

15. The electrode sheet of claim 1, wherein in the second positive electrode mixture layer, a mixing weight ratio of the first positive electrode active material to the second positive electrode active material is in a range of 85:15 to 70:30.

16. The electrode sheet of claim 1, wherein the particle strength of the particles in the second positive electrode mixture layer is in a range from 30 to 300 MPa.

17. The electrode sheet of claim 1, wherein the current collector comprises two regions of the non-coated part at two sides of the current collector in a longitudinal direction, and the current collector comprises two regions of the second positive electrode mixture layer disposed adjacent to the non-coated part.

18. The electrode sheet of claim 1, wherein the first positive electrode mixture layer is disposed on only on the central portion of the current collector along the longitudinal direction of the electrode sheet.

* * * * *